Figure 1:
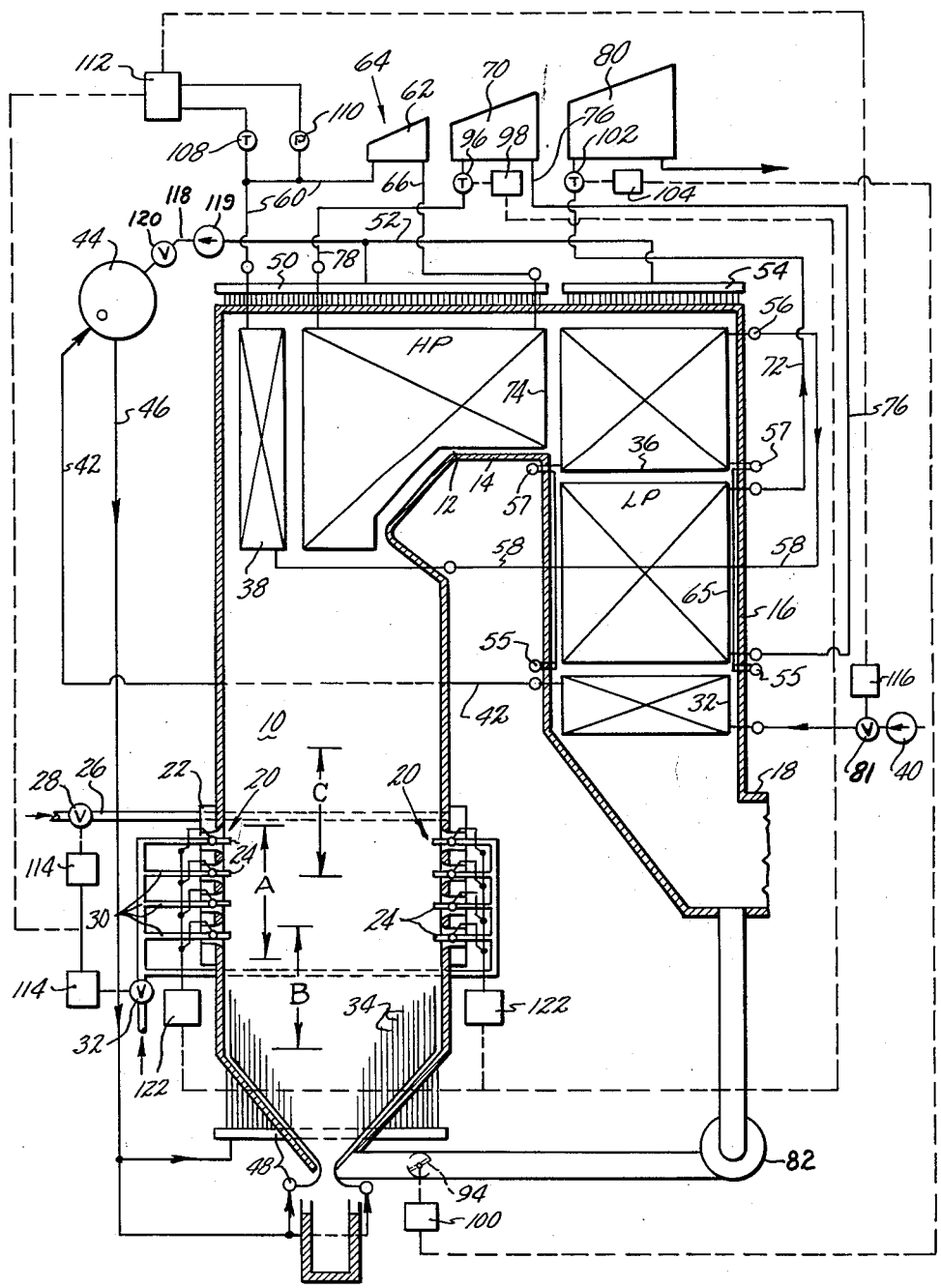

Nov. 3, 1964    W. H. CLAYTON, JR    3,155,078
DOUBLE REHEAT POWER PLANT ARRANGEMENT
Filed Dec. 28, 1962    2 Sheets-Sheet 1

INVENTOR
WILLIAM H. CLAYTON, JR.
BY Eldon H. Luther
ATTORNEY

Nov. 3, 1964  W. H. CLAYTON, JR  3,155,078
DOUBLE REHEAT POWER PLANT ARRANGEMENT
Filed Dec. 28, 1962  2 Sheets-Sheet 2

INVENTOR
WILLIAM H. CLAYTON, JR.
BY Eldon H. Lutter
ATTORNEY

United States Patent Office 3,155,078
Patented Nov. 3, 1964

3,155,078
DOUBLE REHEAT POWER PLANT
ARRANGEMENT
William H. Clayton, Jr., Windsor, Conn., assignor to
Combustion Engineering, Inc., Windsor, Conn., a corporation of Delaware
Filed Dec. 28, 1962, Ser. No. 247,931
9 Claims. (Cl. 122—479)

This invention relates generally to power plants wherein a vapor generator is employed to supply the motive fluid for an expansion engine or prime mover with the invention having particular relation to a power plant arrangement operating on the double reheat cycle and at supercritical pressure wherein a vapor generator supplies primary vapor at supercritical pressure to a multi-expansion prime mover with the vapor being conveyed back to the prime mover twice for reheating in order to increase the energy content thereof.

In accordance with the present invention the operating cycle of the power plant is such that as the load is decreased from the maximum value down to control load the percentage of the heat absorption, with relation to the total heat absorption of the unit, required by the high pressure reheater increases substantially with relation to that required by the low pressure reheater. During this decrease in load and throughout this operating load range of the unit, the primary vapor as well as the high pressure and low pressure reheat vapors which are supplied to the prime mover are maintained at a predetermined desired value. In the preferred embodiment the primary vapor temperature is regulated by adjusting the flow of primary fluid through the through-flow circuit and the firing rate of the vapor generator. The high pressure and the low pressure reheat vapors are regulated by means of control actions which are independent of the firing rate of the unit with these actions being such as not to degrade the cycle and thereby cause a loss in efficiency. The arrangement is preferably such that the low pressure reheat vapor is regulated by means of recirculating combustion gases into the furnace at a location remote from the furnace outlet and regulating this recirculation to maintain the low pressure reheat at its desired value throughout the operating load range. While the low pressure reheat receives the preponderance of its heat input by convection and the high pressure reheat receives a preponderance of its heat input by means of radiation with the relation of this radiant heat input of the high pressure reheater being such that notwithstanding that the heat input requirement to the high pressure reheater, with relation to the total heat absorption of the unit, increases substantially with relation to that of the low pressure reheater, this high pressure reheater temperature will also be maintained close to its desired value as the load on the unit decreases from maximum to the control load without any additional control action. This effect is achieved through the relative heat absorption characteristics of radiant type heat exchange surface and convection type heat exchange surface with the former increasing while the latter decreases with decrease in load.

The regulation of the high pressure reheat vapor temperature is assisted by regulating the temperature of the gases passing over this reheater and passing from the furnace with this regulation being achieved by adjusting the zone of combustion in the furnace and by means of this control action a vernier type of control may be provided for the high pressure reheat wherein the outlet temperature of the high pressure reheater may be accurately regulated throughout the operating load range.

Accordingly, it is an object of this invention to provide an improved power plant organization operating on the double reheat cycle and wherein the primary fluid characteristics as well as the high pressure and the low pressure reheat temperatures are maintained at their predetermined desired values throughout the operating load range.

Another object of the invention is to provide such a power plant arrangement wherein the forced through-flow supercritical vapor generator operating on the double reheat cycle employs a combination of gas recirculation and adjustment of the zone of combustion in the furnace to regulate the two reheat temperatures.

Still another object of the invention is to provide such a vapor generator organization wherein the high pressure reheat receives a preponderance of its heat by means of radiation and the low pressure reheat receives a preponderance of its heat input by means of convection with the control being such that the gas recirculation control effectively regulates the temperature of the low pressure reheat and only a minor control action is required to regulate the high pressure reheat temperature with this control action being achieved by means of adjusting the zone of combustion.

Other and further objects of the invention will become apparent to those skilled in the art as the description proceeds.

Figure 2:
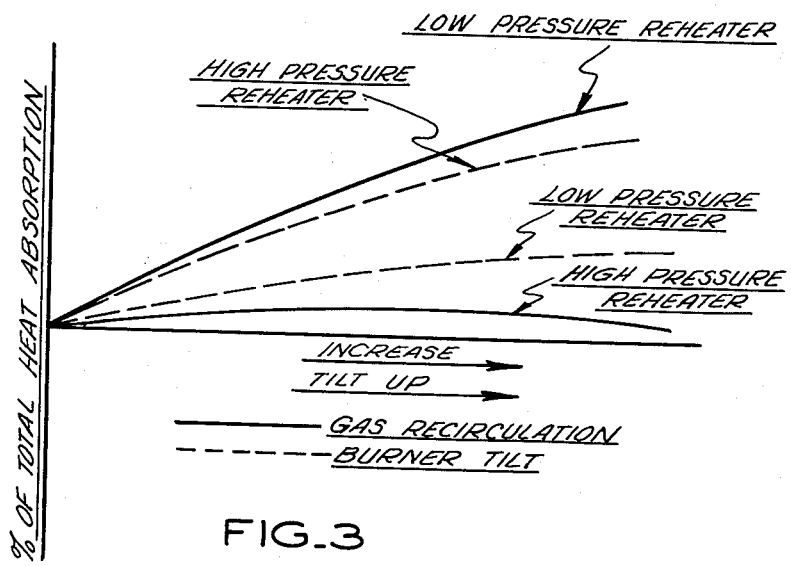
Figure 3:
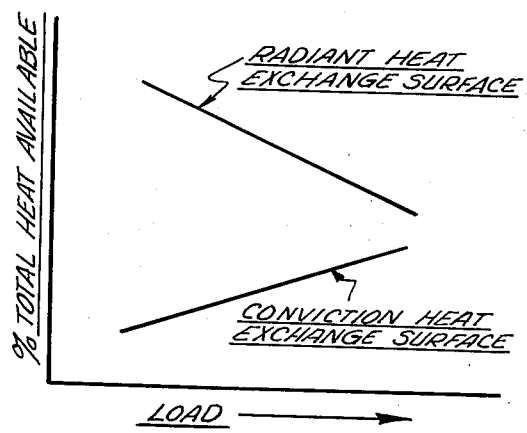
Figure 4:
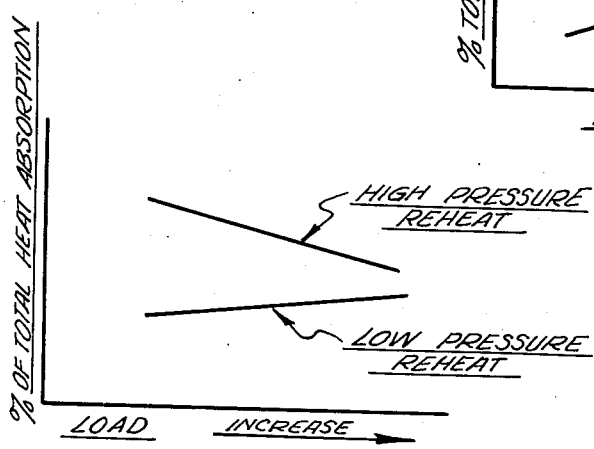

With the aforementioned objects in view the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein:

FIGURE 1 is a diagrammatic representation, in the nature of a vertical section, of the power plant organization, including the vapor generator, of the present invention;

FIGURE 2 is a graphic representation showing the effect, at a particular load (for example full load), that the introduction of cool combustion gases into the lower region of the furnace has on the heat absorption of the high pressure and low pressure reheaters and also the effect that adjustment of the zone of combustion has on the heat absorption of the high pressure and the low pressure reheaters;

FIGURE 3 is a graphic representation showing the change in the percent of total heat available for radiant and convection heat exchange surface in the vapor generator with change in load; and FIGURE 4 is a graphic illustration showing the operating characteristic of the supercritical forced through-flow vapor generator of the present invention wherein, of the total heat absorption of the unit, as the load decreases the percentage required by the high pressure reheat increases while that required by the low pressure reheat decreases.

Referring now to the drawing, wherein like reference characters are used throughout to designate like elements, the forced through-flow supercritical vapor generator illustratively disclosed therein includes the furnace 10, which is preferably generally rectangular in transverse section and into the lower region of which fuel and air are introduced through the burner organizations designated generally 20. The combustion gases generated in the furnace pass upwardly therethrough and through the outlet 12 located at the upper end of the rear wall with these gases then passing through the laterally extended gas pass 14 and then downwardly through the vertically extending gas pass 16 finally egressing through the duct 18 which may convey these gases to suitable additional equipment such as an air heater, forced draft fan and the like, and finally to a stack where they are discharged to atmosphere.

The primary fluid of the supercritical vapor generator is forced through the through-flow circuit thereof by means of the feed pump 40 with this fluid traversing the control valve 81 and then being conveyed to the economizer 32. This fluid is discharged from the economizer through conduit 42 into the mixing drum 44. From drum 44 the fluid is conveyed through conduit 46 and then up through the tubes 34 which line the furnace walls and have their lower ends connected with the headers 48. The upper ends of these tubes are connected with the header organization 50 and the fluid is discharged into this header and is then conveyed through conduit 52 to the header organization 54. The fluid is then conveyed down through tubes that are disposed on the walls of gas pass 16 and into the header 55 and thereafter into the header 57. From this header 57 the fluid is conveyed to the heat exchange portion 36 and into header 56. From header 56 the through-flow is conveyed via conduit 58 to the final heat exchange portion 38 of the through-flow circuit where the supercritical pressure fluid, which is now in vapor form, is heated to its final temperature and is conveyed through conduit 60 to the high pressure stage 62 of the multi-stage turbine machine 64.

The characteristics of this fluid delivered to the high pressure turbine, i.e., the temperature and pressure thereof, are maintained constant throughout the load range over which the vapor generator is operated and for this purpose temperature and pressure responsive devices 108 and 110 respectively, are provided with these devices being connected with the controller 112 which, in turn, regulates the fuel and air input through manipulation of the valves 31 and 28 respectively via the actuator 114 and regulates the flow of primary fluid through the through-flow circuit through manipulation of valve 81 via the actuator 116.

The exhaust from the high pressure stage 62 of the turbine is conveyed through conduit 66 to the high pressure reheater identified as 74 in the illustrative organization. This reheater is so positioned that it receives a preponderance of its heat input through radiant heat exchange with the high pressure reheater being located in the upper region of the furnace for this purpose. It will be understood that in lieu of providing heat exchange surface in the gas stream in the upper region of the furnace, a substantial portion of the high pressure reheater may be comprised of furnace wall surface preferably located on regions of the furnace wall in the upper portion of the furnace. In traversing the high pressure reheater the high pressure reheat vapor is reheated to its desired temperatue and is then conveyed through conduit 78 to the intermediate stage 70 of the turbine.

The exhaust from this intermediate turbine stage 70 is conveyed through conduit 76 to the low pressure reheater 65. This low pressure reheater is heated predominantly by convection heat exchange and as disclosed is positioned downstream of the heat exchange section 36 of the through-flow circuit in the gas pass 16. In traversing this convection heat exchange low pressure reheater, the low pressure reheat vapor is reheated to its desired temperature and is conveyed through conduit 72 to the inlet of the low pressure stage 80 of the turbine. The exhaust from this low pressure turbine stage is then conveyed through the conventional equipment such as condenser, feedwater heaters, deaerators, etc., to the inlet of the feed pump 40 with the fluid again being forced through the through-flow circuit of the vapor generator.

As the load on the vapor generator decreases from its maximum value toward its lowermost value, i.e. the control load, the low pressure reheat temperature, i.e., the temperature at the outlet of the low pressure reheater 65, will tend to fall from its predetermined value. To overcome this effect there is provided, with the organization of the invention, a gas recirculation system which includes recirculation fan 82 connected with the lower region of gas pass 16 and which is effective to convey recirculated gases through duct 88 to the lower region of the furnace with this duct being connected with the furnace hopper bottom.

The effect of introducing recirculative combustion gases into the furnace is illustrated in FIGURE 2 wherein the solid line curves indicate the change in heat absorption produced with increasing gas recirculation. It will be noted that the change that is effected with relation to the low pressure reheater is very much greater than that produced with the high pressure reheater. The reason for this is that the control effect with regard to increasing the heat absorption in the convection heat exchange surfaces is progressively more pronounced in the heat exchange surfaces that are further downstream with regard to the combustion gas flow.

While the gas recirculation system may substantially increase the heat absorption of the convection low pressure reheater, the vapor generator organization of the present invention has the characteristic that of the total heat absorption the percentage required by the high pressure reheat substantially increases with decrease in load while that required by the low pressure reheater may decrease or remain generally the same. Thus as the load is decreased, there is a requirement to increase the heat absorption of the high pressure reheater with this requirement necessitating a greater compensating effect than is required for the low pressure reheater. This requirement with regard to the high pressure reheater is fulfilled in the organization of the present invention by having the high pressure reheater so disposed that it receives a preponderance of its heat input by means of radiation.

As viewed in FIGURE 3, it will be seen that as the load decreases the total heat available for radiant heat exchange surface greatly increases while that available for convection heat exchange surface very substantially decreases. This latter characteristic necessitates the gas recirculation with relation to the convection low pressure reheater. By arranging the relationship of the radiant heat absorption surface of the high pressure reheater in a suitable manner to the convection heat absorption surface of the low pressure reheater, i.e., by providing a sufficient amount of radiant high pressure reheat surface as contrasted with the convection low pressure reheat surface, the characteristic depicted in FIGURE 3 may be employed in a manner so that by means of the gas recirculation control system both the low pressure and the high pressure reheat vapor temperatures may be maintained close to their desired value throughout a predetermined load range.

Because of the variations that would be encountered during operation, such as slagging conditions, variations in cleanliness of the heat exchange surface, etc., it would be impractical and extremely difficult to accurately maintain both the low pressure reheater outlet temperature and the high pressure reheater outlet temperature at their predetermined desired values throughout the operating load range with gas recirculation control per se. Accordingly, in addition to the gas recirculation control there is provided with the present invention and used simultaneously with the recirculation control an additional control comprised of adjusting the zone of combustion in the furnace with relation to the furnace outlet. This adjustment of the zone of combustion acts as a vernier control for control of the high pressure reheat temperature and the adjustment of the zone of combustion may advantageously be achieved by means of adjusting the nozzles 24 of the burner organization 20. For this purpose the burner organization 20 may advantageously take the form shown and described in U.S. Patent 2,697,422, issued December 21, 1954.

This zone of combustion may be adjusted between the zone identified as C and the zone identified as B with the zone A being that achieved when nozzles 24 are in their horizontal position.

The operation of the unit and the control that is achieved is as follows. With the unit operating at maximum load, the heat exhcange surface of the unit is so proportioned that with the burners at a position so that the zone of combustion is intermediate its upper and lower range and with little or no recirculation, the proper low pressure and high pressure reheat temperatures are achieved. It would generally be desirable to provide a small amount of gas recirculation at maximum load in order that the recirculation fan will be working at all loads, thereby insuring against fan damage due to reverse flow through the recircultion conduit. As the load on the unit is decreased from maximum down toward the control load, the amount of recirculated gases is progressively increased in order to increase the heat input to the low pressure reheater thereby maintaining the low pressure reheat temperature generally at its desired value. Because the predominant heat input to the high pressure reheater is radiant and as a result of the characteristic depicted in FIGURE 3, the high pressure reheat will generally be close to its desired value as the load is decreased.

The introduction of the recirculated gases is preferably controlled in response to the outlet temperature of the low pressure reheat with temperature responsive device 102 being provided in conduit 72 for this purpose and with this temperature responsive device, through the action of controller 104, being effective to actuate the damper 94 in duct 88 via the actuator 100. Thus, through the regulated introduction of recirculated gases the low pressure reheat temperature is maintained at its desired value, while the radiant surface of the high pressure reheater is such that the high pressure reheat temperature will be maintained generally at its desired value with the decrease in load from the maximum toward the control load and accurate control of the outlet temperature of the high pressure reheater is provided by means of adjusting the zone of combustion. As the load is decreased, the zone of combustion may have to be either moved toward or away from the furnace outlet depending upon whether an increase or a decrease in the outlet temperature of the high-pressure reheater is required. The regulation of the zone of combustion is preferably controlled in response to the outlet temperature of the high pressure reheater and for this purpose the temperature responsive device 96 is effective through the controller 98 to adjust the burner nozzles 24 via the actuators 122.

Accordingly, with the invention both the high pressure and the low pressure reheat temperatures are maintained generally at their desired value throughout the operating load range of the unit. The predominant or greater portion of the control is effected by means of gas recirculation with only a minor or vernier control effect being required from the adjustment of the zone of combustion in the furnace.

In order to have a pronounced effect on the heat absorption of the low pressure reheater from the use of recirculative combustion gases, it is desired that the low pressure reheater be well downstream in the combustion gas stream and accordingly for this reason it is desired to have a portion of the through-flow circuit, such as the heat exchanger 36, located in the combustion gas stream upstream of the location where at least a preponderance of the heat input to the lower pressure reheater is provided.

In the illustrative forced through-flow supercritical vapor generator there is provided, with relation to the through-flow circuit, a recirculating circuit including the conduit 118 into which is connected the pump 119 and valve 120 with this conduit connecting the conduit 52 to the mixing vessel 44. The purpose of this recirculation system is to provide adequate flow through the high heat absorption tubes of the through-flow circuit that line the furnace wall at low loads and during startup, with this arrangement being shown and described in detail in the co-pending application Serial No. 127,395, filed July 27, 1961, with the inventor being Willburt W. Schroedter.

Reference to vapor generator and vapor generation as contained herein is intended to include both steam generators as well as vapor generators using vaporizable fluids other than water. It will be appreciated that in accordance with present day technology the most practical form of the invention is with a steam generator.

The various heat exchangers that are positioned in the combustion gas stream that is generated in and passes from the furnace are represented schematically in the diagrammatic illustration of FIGURE 1. It will be appreciated that these heat exchangers, in accordance with conventional practice, are comprised of numerous tubuar members that are connected in parallel flow with regard to the vaporizable fluid and which are sinuously or otherwise bent to form a tube bundle or group, with it being the general practice to space these tubes in parallel planes across the width of the gas pass or combustion gas stream.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A supercritical forced through-flow vapor generator operating on the double reheat cycle and having the characteristic that as the load decreases from maximum the percentage of the total heat absorption of the unit required by the high pressure reheat increases substantially in relation to that required by the low pressure reheat and including a fluid cooled furnace having a combustion gas outlet and having firing means remote therefrom, a through-flow circuit through which the primary fluid is forced and including tubular members on the walls of the furnace, a high pressure reheater disposed to receive the preponderance of its heat input by radiation, a convection low pressure reheater disposed in the stream of combustion gases issuing from the furnace, means for regulating the firing rate and the flow of primary fluid through the through-flow circuit in a manner to maintain the outlet conditions of the primary fluid at their desired value with varying load, and means for regulating the high pressure and low pressure reheat temperature with varying load to maintain these reheat temperatures at their desired value, including means for introducing cool combustion gases into the furnace at a location to increase the heat content of the gas stream egressing from the furnace and means, independent of the firing rate, operative to adjust the temperature of the gases egressing from the furnace, means operative to simultaneously regulate the introduction of cool combustion gases into the furnace and the adjustment of the temperature of the combustion gases passing from the furnace to maintain the temperature of the two reheats at their desired value throughout a substantial load range.

2. In a power plant the combination of a supercritical forced through-flow vapor generator operating on the double reheat cycle and having the characteristic that as the load decreases from maximum the percentage of the total heat absorption required by the high pressure reheat increases while that required by the low pressure reheat decreases, said generator including an elongated furnace fired adjacent one end and having a combustion gas outlet at its opposite end, a through-flow circuit through which the supercritical primary fluid is conveyed and including tubular portions on the walls of the furnace, a predominantly radiant heated high pressure reheater at said opposite end of the furnace, a predominantly convection heated low pressure reheater positioned in the gas stream issuing from the furnace, means operative to regulate the flow of primary fluid through the through-flow circuit and the firing of fuel into the furnace to maintain the outlet conditions of the primary fluid at a predetermined desired value throughout a given load range, means operative to provide a plurality of control effects for controlling the high pressure and the low pressure reheat temperatures at their predetermined desired values throughout said given load range and including means for introducing combustion gases that have traversed said reheaters into the furnace at a location to increase the heat content of the combustion gas stream egressing from the furnace, the relative disposition of the radiant high pressure reheater and the convection low pressure reheater being such that through this introduction of combustion gases into the furnace these two reheat temperatures may be maintained approximately at their desired value throughout the given load range, means operative to regulate such introduction of combustion gases into the furnace, means independent of the firing rate operative to vary the temperature of the combustion gases issuing from the furnace to thereby correct any variation in the reheat temperatures, and means operative, simultaneously with the regulation of the introduction of combustion gases in the furnace to regulate this last-named means whereby the two reheat temperatures may be maintained at their desired value throughout said given load range.

3. A forced through-flow vapor generator operating at supercritical pressure and on the double reheat cycle and having the characteristic that as the load decreases from maximum the percentage of the total heat absorption required by the high pressure reheat increases while that required by the low pressure reheat decreases, said generator including an upright elongated furnace having a combustion gas outlet adjacent one end, means for firing said furnace remote from said outlet, a through-flow circuit including tubular members on walls of the furnace and through which the primary fluid is forced at supercritical pressure, a gas recirculation system operative to introduce cooled combustion gases into the furnace and at a location remote from the furnace outlet, a predominantly radiant heated high pressure reheater at said one end of the furnace and a predominantly convection heated low pressure reheater disposed in the combustion gas stream downstream of the high pressure reheater, the disposition of the high pressure reheater and the low pressure reheater with relation to each other and with relation to the other heat exchange surface of the vapor generator being such that as the load decreases from maximum to the control load the outlet temperature of the high pressure reheater and the low pressure reheater may be maintained approximately at their desired value through the regulated introduction of said cooled combustion gases into the furnace, means for regulating such introduction of combustion gases into the furnace, and simultaneously therewith means operative to adjust the zone of combustion in the furnace with relation to the furnace outlet to correct for any variation in the temperature of the reheat vapors from their desired value.

4. A supercritical forced through-flow vapor generator operating on the double reheat cycle and having the characteristic that as the load decreases from maximum the percentage of the total heat absorption required by the high pressure reheat increases substantially in relation to that required by the low pressure reheat and including a fluid cooled furnace having a combustion gas outlet and having firing means remote therefrom, a through-flow circuit through which the primary fluid is forced and including tubular members on the walls of the furnace, a high pressure reheater disposed to receive the preponderance of its heat input by radiation, a convection low pressure reheater disposed in the stream of combustion gases issuing from the furnace, means for regulating the firing rate and the flow of primary fluid through the through-flow circuit in a manner to maintain the outlet conditions of the primary fluid at their desired value with varying load, and means for regulating the high pressure and low pressure reheat temperature with the varying load to maintain these reheat temperatures at their desired value, including means for introducing cool combustion gases into the furnace at a location to increase the heat content of the gas stream egressing from the furnace and means, independent of the firing rate, operative to adjust the temperature of the gases egressing from the furnace, means responsive to the temperature of the low pressure reheat operative to regulate the introduction of cool combustion gases into the furnace and the means operative simultaneous therewith and responsive to the temperature of the high pressure reheat to adjust the temperature of the combustion gases passing from the furnace to maintain the temperature of the two reheats at their desired value throughout a substantial load range.

5. A power plant installation including a forced through-flow supercritical vapor generator operating on the double reheat cycle and having the characteristic that as the load decreases from maximum the percentage of the total heat absorption of the unit as required by the high pressure reheater increases substantially with relation to that required by the low pressure reheater, said generator including an elongated furnace having a combustion gas outlet adjacent one end, means operative to fire the furnace at a location remote from said outlet, a through-flow circuit including tubular members on walls of the furnace and including heat exchange surface in the gas stream issuing from the furnace, said firing means including tiltable burners operative to adjust the zone of combustion toward and away from the furnace outlet, means for controllably introducing cool combustion gases into the furnace at a location remote from said combustion outlet, high pressure reheater means receiving its heat input predominantly by radiation and including heat exchange surface associated with the furnace at a region thereof remote from the firing means, predominantly convection low pressure reheater means disposed in the combustion gas stream issuing from the furnace, the effective location at which the low pressure means receives a preponderance of its heat input being downstream with regard to combustion gas flow of the loction at which the high pressure reheat means receives a preponderance of its heat input, with said heat exchanger that forms part of the through-flow circuit being interposed between these locations, means responsive to the outlet temperature of the low pressure reheater operative to regulate the introduction of said combustion gases into the furnace to maintain said temperature constant with varying load, the radiant heat absorption of the high pressure reheater being such that this regulation of the low pressure reheat temperature maintains the outlet temperature of the high pressure reheat close to its desired value with varying load, means responsive to the outlet temperature of the high pressure reheater operative to regulate the adjustment of said tilting burners to correct for any variation in this temperature from its desired value.

6. In a supercritical forced through-flow vapor generator operating on the double reheat cycle and having the characteristic that of the total heat absorption of the unit the percentage required by the high pressure reheater increases substantially relative to that of the low pressure reheater as the load is decreased from maximum, the improved method of operation comprising introducing and burning the fuel in the furnace generally at one location to create a stream of combustion gases, passing said stream of combustion gases from the furnace at a location remote from said one location, passing the primary fluid in heat exchange relation with the burning fuel and the combustion gases passing through the furnace, regulatting the flow of the primary fluid and the firing of the furnace to reguate the outlet characteristics of the primary fluid at their desired value with varying load, passing the low pressure reheat fluid in heat exchange relation with the stream of combustion gases issuing from the furnace so that heat input thereto is primarily convective, introducing combustion gases which have traversed said low pressure reheater into the furnace at a location remote from the combustion gas outlet thereof, regulating this introduction of combustion gases to maintain the low pressure reheat temperature at a desired value throughout a given load range, passing the high pressure reheat vapor in heat exchange relation with the combustion gas stream and the burning fuel in the furnace so that it receives a preponderance of its heat input through radiation with the radiant absorption being such that the high pressure reheat remains generally at its desired values throughout said given load range, and adjusting the zone of combustion in response to the outlet temperature of the high pressure reheat to correct for any variation thereof from its desired value.

7. In a supercritical forced through-flow vapor generator operating on the double reheat cycle and having the characteristic that as the load decreases from maximum throughout the operating load range the percentage of heat absorption, with relation to the total, required by the high pressure reheat increases in relation to that of the low pressure reheat, said generator including a fluid cooled furnace having a combustion gas outlet adjacent one end and fired at a location remote therefrom with a gas pass extending from said outlet, the improved method of operation comprising introducing and burning fuel in the furnace at said remote location and creating a combustion gas stream that passes therethrough and through the gas pass, imparting heat to the primary fluid and regulating the flow of said primary fluid and the firing rate of the unit in response to the outlet characteristic of said fluid to maintain them at their desired value throughout the operating load range, heating the high pressure reheat fluid predominantly by radiation and including passing this fluid in heat exchange relation with the combustion gas stream in said one end of the furnace, heating the low pressure reheat fluid predominantly by convection and including passing the low pressure reheat vapor in heat exchange relation with the combustion gas stream traversing said gas pass, regulating the high pressure and the low pressure reheat vapors with varying load by introducing into the furnace at a location remote from said one end combustion gases which have imparted heat to the two reheats, regulatingly increasing this introduction of combustion gases with decrease in load to maintain said reheat temperatures generally at their desired value, and simultaneously with this introduction of combustion gases into the furnace and independent of the firing rate of the furnace varying the temperature of the combustion gases from which pass through and from said one end of the furnace to compensate for any discrepancy in the reheat temperature from their desired value.

8. In a supercritical forced through-flow vapor generator operating on the double reheat cycle and having the characteristic that as the load decreases from maximum throughout the operating load range the percentage of heat absorption, with relation to the total, required by the high pressure reheat increases relative to that of the low pressure reheat, said generator including a fluid cooled furnace having a combustion gas outlet adjacent one end and fired at a location remote therefrom with a gas pass extending from said outlet, the improved method of operation comprising introducing and burning fuel in the furnace at said remote location and creating a combustion gas stream that passes therethrough and through the gas pass, imparting heat to the primary fluid and regulating the flow of said primary fluid and the firing rate of the unit in response to the outlet characteristic of said fluid to maintain said characteristics at their desired value throughout the operating load range, heating the high pressure reheat fluid predominantly by radiation and including passing this fluid in heat exchange relation with the combustion gas stream in said one end of the furnace, heating the low pressure reheat fluid predominantly by convection and including passing the low pressure reheat vapor in heat exchange relation with the combustion gas stream traversing said gas pass, regulating the high pressure and the low pressure reheat vapors with varying load by introducing into the furnace at a location remote from said one end combustion gases which have imparted heat to the two reheats, sensing the outlet temperature of the low pressure reheat and in response thereto regulatingly increasing the introduction of combustion gases with decrease in load to maintain this temperature generally at its desired value, and simultaneously with this introduction of combustion gases into the furnace and independent of the firing rate of the furnace varying the temperature of the combustion gases which pass through and from said one end of the furnace and regulatingly controlling this temperature variation in response to the outlet temperature of the high pressure reheater to maintain this latter temperature at its desired value.

9. In a supercritical forced through-flow vapor generator operating on the double reheat cycle and having the characteristic that as the load decreases from maximum throughout the operating load range the percentage of heat absorption, with relation to the total, required by the high pressure reheat increases relative to that of the low pressure reheat, said generator including a fluid cooled furnace having a combustion gas outlet adjacent one end and fired at a location remote therefrom with a gas pass extending from said outlet, the improved method of operation comprising introducing and burning fuel in the furnace at said remote location and creating a combustion gas stream that passes therethrough and through the gas pass, imparting heat to the primary fluid and regulating the flow of said primary fluid and the firing rate of the unit in response to the outlet characteristic of said fluid to maintain said characteristics at their desired value throughout the operating load range, heating the high pressure reheat fluid predominantly by radiation and including passing this fluid in heat exchange relation with the combustion gas stream in said one end of the furnace, heating the low pressure reheat fluid predominantly by convection and including passing the low pressure reheat vapor in heat exchange relation with the combustion gas stream traversing said gas pass, regulating the high pressure and the low reheat vapors with varying load by introducing into the furnace at a location remote from said one end combustion gases which have imparted heat to the two reheats, controlling the introduction of gases in response to the low pressure reheat temperature to maintain said temperature generally constant with varying load, simultaneous with such gas introduction adjusting the zone of combustion relative to the outlet of the furnace and in response to the high pressure reheat temperature to control the same.

References Cited in the file of this patent

UNITED STATES PATENTS

| | | |
|---|---|---|
| 2,984,984 | Dickey | May 23, 1961 |
| 3,035,556 | Brunner | May 22, 1962 |

FOREIGN PATENTS

| | | |
|---|---|---|
| 793,048 | Great Britain | Apr. 9, 1958 |

UNITED STATES PATENT OFFICE
CERTIFICATE OF CORRECTION

Patent No. 3,155,078                                            November 3, 1964

William H. Clayton, Jr.

It is hereby certified that error appears in the above numbered patent requiring correction and that the said Letters Patent should read as corrected below.

Column 10, line 50, after "low" insert -- pressure --; line 53, for "the", second occurrence, read -- this --.

Signed and sealed this 30th day of March 1965.

(SEAL)
Attest:

ERNEST W. SWIDER                                        EDWARD J. BRENNER
Attesting Officer                                         Commissioner of Patents